(12) United States Patent
Hallstadius et al.

(10) Patent No.: US 11,565,482 B2
(45) Date of Patent: Jan. 31, 2023

(54) APPARATUS FOR QUALITY ASSESSMENT OF A SEALING SECTION OF A PACKAGE FOR FOOD PRODUCTS, AND A METHOD THEREOF

(71) Applicant: Tetra Laval Holdings & Finance S.A., Pully (CH)

(72) Inventors: Hans Hallstadius, Lund (SE); Magnus Råbe, Åkarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/286,508

(22) PCT Filed: Oct. 21, 2019

(86) PCT No.: PCT/EP2019/078506
§ 371 (c)(1),
(2) Date: Apr. 19, 2021

(87) PCT Pub. No.: WO2020/088964
PCT Pub. Date: May 7, 2020

(65) Prior Publication Data
US 2021/0339482 A1    Nov. 4, 2021

(30) Foreign Application Priority Data

Oct. 31, 2018  (EP) ..................................... 18203796

(51) Int. Cl.
*B29C 65/82* (2006.01)
*B29C 65/08* (2006.01)
(Continued)

(52) U.S. Cl.
CPC .......... *B29C 65/8253* (2013.01); *B29C 65/08* (2013.01); *B29C 65/368* (2013.01);
(Continued)

(58) Field of Classification Search
CPC ............ B29C 66/849; B29C 66/73921; B29C 65/8253; B29L 2031/7166
See application file for complete search history.

(56) References Cited

U.S. PATENT DOCUMENTS 5,168,141 A * 12/1992 Tashjian ............... B23K 26/042
                                                        219/121.64
5,184,190 A *  2/1993 Rai .................... G01N 21/8901
                                                        250/559.12
(Continued)

FOREIGN PATENT DOCUMENTS

| EP | 1 908 585 A1 | 4/2008 |
| EP | 1908585 B1 | 4/2014 |
| WO | 2010/031026 A2 | 3/2010 |

OTHER PUBLICATIONS

International Search Report for corresponding Application No. PCT/EP2019/078506, dated Dec. 16, 2019.

*Primary Examiner* — Daniel McNally
(74) *Attorney, Agent, or Firm* — Renner, Otto, Boisselle & Sklar, LLP

(57) ABSTRACT

An apparatus for quality assessment of a sealing section of a package for food products. The package includes at least a robustness layer and a plastic layer. The sealing section is formed by holding a first section and a second section of the package against each other while providing heat such that the plastic layer of the first and second section melt and the first and second section adhere to each other. The apparatus includes a sample holder arranged for fixating a sample including the sealing section of the package. At least part of the sample holder is transparent, a magnification device arranged on a first side of the sample holder, and an illumination device arranged on a second side of the sample holder. Light is provided to the magnification device through the sample holder The first and second side are opposite sides of the sample holder.

11 Claims, 8 Drawing Sheets

(51) Int. Cl.
*B29C 65/36* (2006.01)
*B29C 65/00* (2006.01)
*B29L 31/00* (2006.01)

(52) U.S. Cl.
CPC ...... *B29C 65/3656* (2013.01); *B29C 66/1122* (2013.01); *B29C 66/72321* (2013.01); *B29C 66/72328* (2013.01); *B29C 66/73921* (2013.01); *B29C 66/849* (2013.01); *B29L 2031/7166* (2013.01)

(56) References Cited

U.S. PATENT DOCUMENTS

| | | | | |
|---|---|---|---|---|
| 5,260,766 | A * | 11/1993 | Armitage | B29C 66/4312 250/559.46 |
| 5,386,293 | A * | 1/1995 | Barnard | G01N 21/909 356/240.1 |
| 2006/0175560 | A1 * | 8/2006 | Yokote | B29C 66/4312 250/559.45 |
| 2007/0125489 | A1 | 6/2007 | Paul | |
| 2013/0160935 | A1 | 6/2013 | Matsuo | |
| 2017/0320167 | A1 | 11/2017 | Chen | |
| 2019/0145886 | A1 * | 5/2019 | Esteban | G01N 21/4788 356/246 |

* cited by examiner

APPARATUS FOR QUALITY ASSESSMENT OF A SEALING SECTION OF A PACKAGE FOR FOOD PRODUCTS, AND A METHOD THEREOF

TECHNICAL FIELD

The present patent application generally relates to the field of packaging. More specifically, it relates to quality assessment of sealing sections in packages for food products.

BACKGROUND ART

Carton-based packages for milk and other food products are well known and appreciated in many parts of the world. One example is the brick-shaped package Tetra Brik™ marketed by Tetra Pak. This package is produced in so-called roll-fed packaging machines. The general principle of this type of machines is to form a tube of packaging material, fill the tube with food product and form packages from a lower end of the tube. Since these steps are made continuously, an advantage is that speeds of 30 000 packages per hours or above can be achieved. Another type of packaging machines for producing packages for food products is so-called blanks-fed packaging machines. In this type of machines, the packaging material is provided in the form of blanks, that is, sleeve-shaped and pre-cut pieces of packaging material, which are filled and formed into packages one by one.

In both types of packaging machines, for each package, a top and a bottom are formed by sealing together two sections of the packaging material. Different sealing technologies, also known as welding technologies, are available today. For a packaging material comprising an Aluminum layer, induction heat sealing technology can be used. The general principle of this technology is to induce a current in the packaging material such that heat is generated. The heat in turn provides for that outer plastic layers in the packaging material melt such that these can adhere to each other when being held against each other. Another example of a sealing technology that can be used is ultrasonic sealing technology. This technology is instead of inducing the current, generating the heat by using ultrasound.

Irrespective of which sealing technology that is used, sealing sections are formed in the packages. These sealing sections provide for that the packages do not leak, but also, in particular for aseptic packages, that unwanted microorganisms cannot enter into the packages. There are different methods today for quality assessment of the sealing sections. A direct approach is to have an operator to look at the packages produced at regular intervals in order to detect deviations that may be caused by insufficient sealing. An example of an indirect approach used for detecting insufficient sealing is to close the packages while providing pressure on the sides such that inwardly bulging side sections are formed in the packages. In case the sealing sections are insufficient, air will leak into the packages resulting in that the side sections are no longer inwardly bulging. As an effect this will make it possible to easily spot packages that may have insufficient sealing sections.

Even though both direct and indirect approaches for detecting insufficient sealing sections in packages are available today, there is a need for improvement such that time and effort needed for identifying packages with insufficient sealing sections can be further reduced.

SUMMARY

It is an object of the invention to at least partly overcome one or more of the above-identified limitations of the prior art. In particular, it is an object to provide an apparatus and a method making it possible to easily and cost-efficiently identify insufficient sealing sections.

According to a first aspect it is provided an apparatus for quality assessment of a sealing section of a package for food products, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the apparatus comprising a sample holder arranged for fixating a sample comprising the sealing section of the package, wherein at least part of the sample holder is transparent, a magnification device arranged on a first side I of the sample holder, an illumination device arranged on a second side 11 of the sample holder, such that light is provided to the magnification device through the sample holder, wherein the first and second side I,II are opposite sides of the sample holder.

The apparatus may further comprise a camera holder for fixating a camera and arranged such that a field of view of the camera is directed towards the sealing section of the sample.

The apparatus may further comprise a first polarizing filter, such as a −45 degrees polarizing filter, arranged between the sample and the illumination device, and a second polarizing filter, such as a +45 degrees polarizing filter, arranged between the sample and the camera.

The apparatus may further comprise a stepping motor arranged for moving the sample holder in relation to the camera holder, wherein the camera is arranged for capturing a series of images, wherein each image is associated with a position of the stepping motor, wherein a computer is configured for stitching the series of images into one and the same image.

The apparatus may further comprise a light controlling device provided with a light emitting area, wherein the light controlling device is arranged to be set in a diffusor light position or a high contrast position.

The light emitting area may have a first length L1 extending in a first length direction L1D and a first width W1 extending in a first width direction W1D, wherein the first length L1 may be greater than the first width W1, wherein the sealing section may have a second length L2 extending in a second length direction L2D and a second width W2 extending in a second width direction W2D, wherein the second length L2 may be greater than the second width W2, wherein the first length direction L1D may be parallel with the second length direction L2D.

The robustness layer may be a carton layer.

According to a second aspect it is provided a method for quality assessment of a sealing section of a package for food products, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the method comprising preparing a sample comprising the sealing section of the package, placing the sample in a sample holder, wherein at least part of the sample holder is transparent, by orientating the sample according to a pre-set orientation and fixating the sample, illuminating the sample by using an illumination device arranged on a second side II of the sample holder, and magnifying the sealing section of the sample by using a magnification device arranged on a first side I of the sample holder, wherein the first and second side I,II are opposite sides of the sample holder.

The method may further comprise capturing image data depicting the sealing section using a camera fixated to a camera holder and a computer connected to the camera, wherein the camera is placed on the second side II of the sample holder, wherein the first and second sides I, II are opposite sides of the sample holder.

The method may further comprise polarizing light emitted from the illumination device before reaching the sample by using a first polarizing filter, such as a −45 degrees polarizing filter, arranged between the sample and the illumination device, and polarizing light passed through the sample holder before reaching the camera by using a second polarizing filter, such as a +45 degrees polarizing filter, arranged between the sample and the camera.

The method may further comprise moving the sample holder in relation to the camera holder by using a stepping motor, wherein the step of capturing image data depicting the sealing section comprises capturing a series of images, wherein each image is associated with a position of the stepping motor, and stitching the series of images into one and the same image.

The step of capturing image data depicting the sealing section may comprise controlling the light by using a light controlling device, capturing image data with the light controlling device set in a diffusor light position, and capturing image data with the light controlling device set in a high contrast position.

The illumination device may be provided with a light emitting area having a first length L1 extending in a first length direction L1D and a first width W1 extending in a first width direction W1D, wherein the first length L1 may be greater than the first width W1, wherein the sealing section may have a second length L2 extending in a second length direction L2D and a second width W2 extending in a second width direction W2D, wherein the second length L2 may be greater than the second width W2, wherein the first length direction L1D may be parallel with the second length direction L2D.

The robustness layer may be a carton layer.

According to a third aspect it is provided a computer program product comprising instructions which, when executed on a computer, cause the computer to carry out the method according to the second aspect.

Still other objectives, features, aspects and advantages of the invention will appear from the following detailed description as well as from the drawings.

BRIEF DESCRIPTION OF THE DRAWINGS

Embodiments will now be described, by way of example, with reference to the accompanying schematic drawings, in which

FIG. 1b illustrates generally a piece of packaging material that may be formed into the package illustrated in FIG. 1a.

FIG. 4 generally illustrates a lower part of the package illustrated in FIG. 1a.

DETAILED DESCRIPTION

Figure 1A:
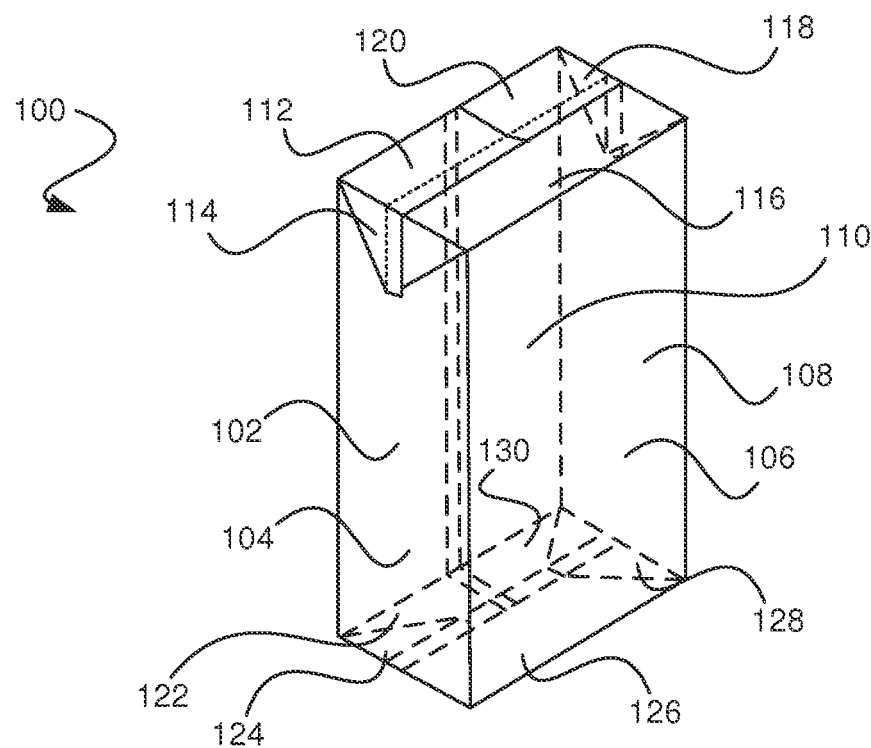
FIG. 1a is a perspective view of a package.
Figure 1B:
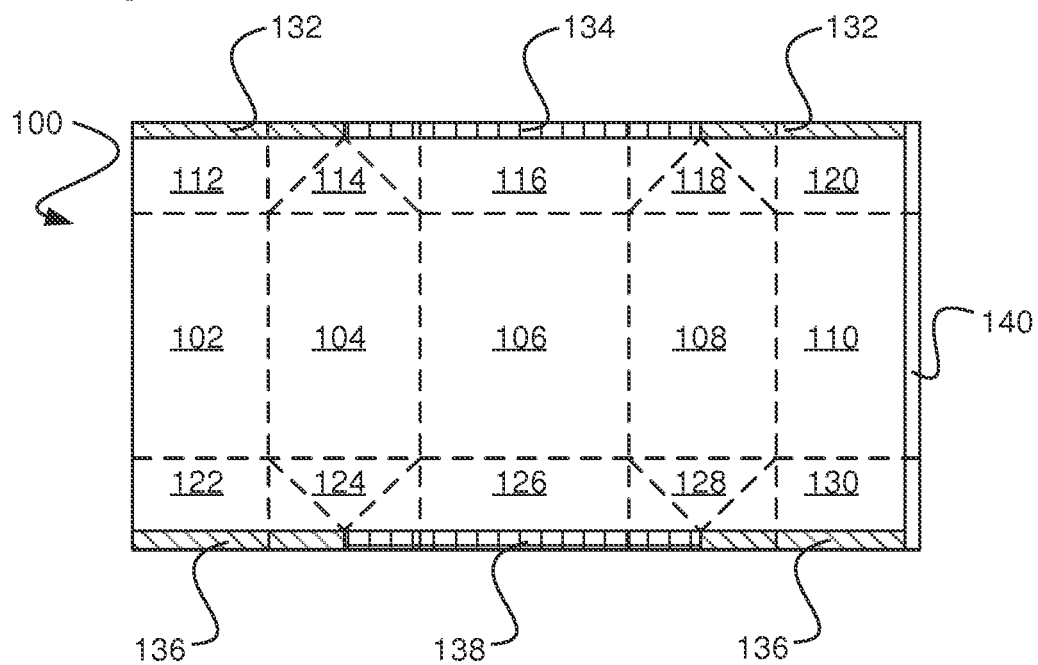

FIG. 1a generally illustrates an example of a carton package 100 made from a piece of package material illustrated in FIG. 1b. The carton package 100 comprises a number of panels divided from each other by weakening lines. The weakening lines provide for that the piece of packaging material can be reliably and efficiently folded into the package 100 by a packaging machine, also known as a filling machine.

In this example, the package 100 comprises a first rear panel 102, a left panel 104, a front panel 106, a right panel 108 and a second rear panel 110, which together form a sleeve-shaped main body of the package 100. The first and second rear panel 102, 110 are attached to each other by a so-called longitudinal sealing. In order to avoid that product held in the package comes into contact with interior layers of the packaging material a peripheral part of the second rear panel 110, that is placed inside a peripheral part of the first rear panel 102, can be protected by a plastic strip, sometimes referred to as a longitudinal sealing strip.

Further, the package 100 comprises a first top rear panel 112, a left corner top panel 114, a top front panel 116, a right corner panel 118 and a second top rear panel 120, which together form a top of the package 100. In a similar manner as the first and second rear panel 102, 110, the first and second rear top panels 112, 120 are attached to each other. In order to close the package 100, the first and second rear top panels 112, 120 are attached to the top front panel 116, two sections of the left corner top panel 114 are attached to each other, and two sections of the right corner top panel 118 are attached to each other. This is provided by a transversal sealing made in the packaging machine after the package is filled with the product.

The package 100 also comprises a first bottom rear panel 122, a left corner bottom panel 124, a bottom front panel 126, a right corner bottom panel 128 and a second bottom rear panel 130, which together form a bottom of the package. In a similar manner as the first and second rear panel 102, 110, the first and second bottom rear panels 122, 130 are attached to each other. In order to close the package 100 and thereby form the bottom, the first and second bottom rear panels 122, 130 are attached to the bottom front panel 126, two sections of the left corner bottom panel 124 are attached to each other, and two sections of the right corner bottom panel 128 are attached to each other.

In case the package 100 is produced in a roll-fed packaging machine, a number of pieces of packaging material is provided after one another on a reel of packaging material. By having the pieces of packaging material arranged in this way a transversal sealing forming the bottom can be made at the same time as a transversal sealing forming the top of a subsequent package is made. After having made the transversal sealings, the packages are separated from each other by cutting them apart in a section between the transversal sealings.

To form the transversal sealing, a first top sealing section 134 and a second top sealing section 132 as well as a first bottom sealing section 136 and a second top sealing section 138 can be provided. After having made the transversal sealing, the packaging material can be separated such that the first top sealing section 132 and the second top sealing section 134 form an upper part of the top of the package 100, and in the first bottom sealing section 136 and the second bottom sealing section 138 form a lower part of the bottom of the package 100. To form the longitudinal sealing, a longitudinal sealing section 140 can be used.

In case the package is produced in a blanks-fed packaging machine, the longitudinal sealing is provided beforehand, that is, the first rear panel 102 is attached to the second rear panel 110 via the longitudinal section 140, such that a sleeve-shaped piece of packaging material is provided. In addition, the separation, also referred to as cutting, is not made in the blanks-fed packaging machine, but is made when producing blanks to be fed into the blanks-fed packaging machine.

Figure 2:
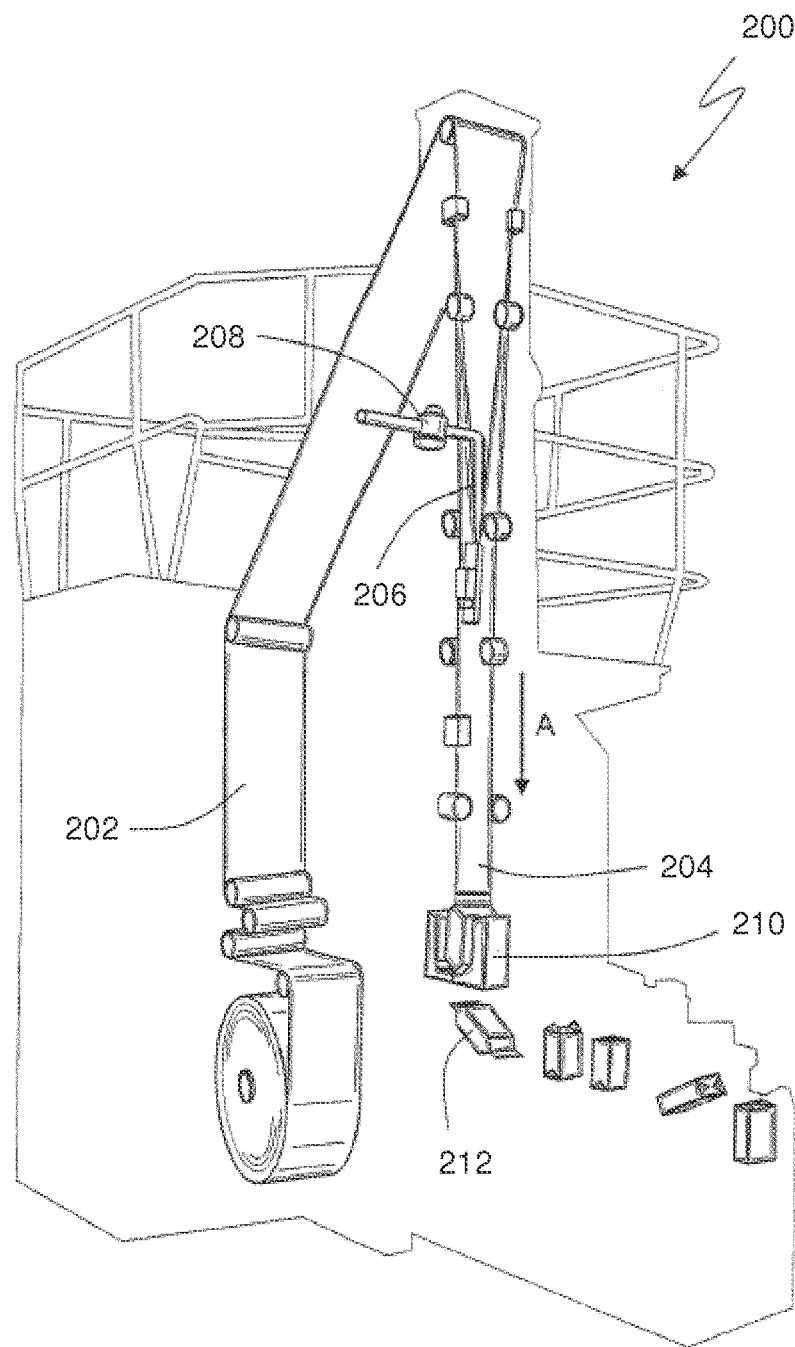
FIG. 2 generally illustrates a roll-fed packaging machine.

FIG. 2 generally illustrates a principle of the roll fed packaging machine 200. A web 202 of packaging material is provided via a reel and is fed through the packaging machine 200 in a feeding direction A. From the web 202 a tube 204 is formed. Food product can be fed into the tube 204 from above using a pipe 206 in combination with a valve 208. In a folding and sealing device 210 packages 212 are formed from the tube 204.

Figure 3:
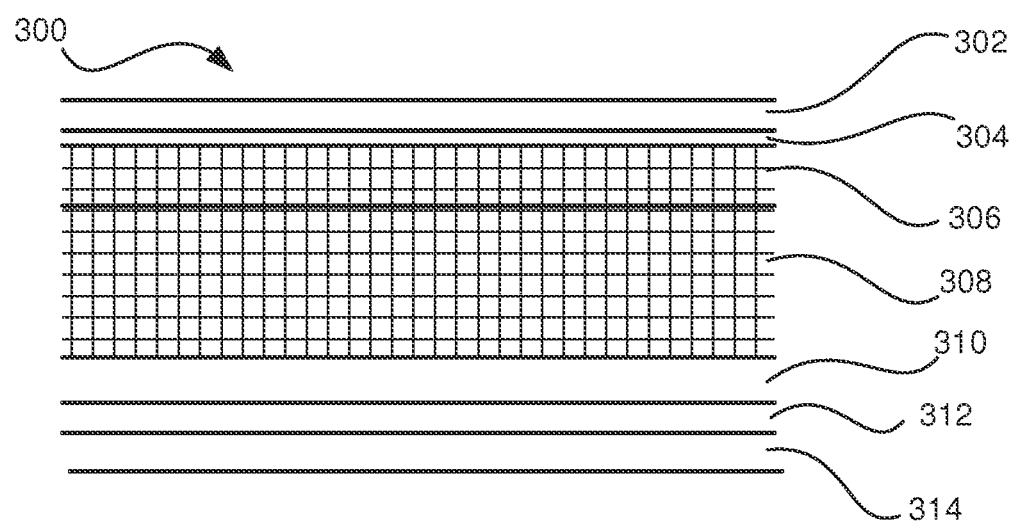
FIG. 3 is a cross-sectional view of a packaging material by way of example.

FIG. 3 generally illustrates by way of example a packaging material 300 that can be used for forming the package 100.

Facing the surrounding space, an outer coating 302 may be provided. The outer coating 302 may serve the purpose of avoiding that moisture of water is coming into contact with a printing layer 304 placed inside the outer coating 302. The printing layer 304 can comprise ink or any other material used for providing a print on the package 100.

Inside the printing layer 304, a first and a second paperboard layer 306, 308 can be provided. The first and second paperboard layers 306, 308 provide robustness to the package 100. The first paperboard layer 306 may be bleached paperboard with or without clay coat. The second paperboard layer 308 may be bleached or unbleached paperboard.

Next a lamination layer 310 made of plastic material can be provided. The lamination layer 310 can provide for that microorganisms are hindered from coming into contact with the product held inside the package 100.

Inside the lamination layer 310, an Aluminum foil 312 can be provided. The Aluminum foil 312 can provide for that light, oxygen and odors are hindered from coming into contact with the product held inside the package 100, but also that flavors inside the package can be released from the package 100. The Aluminum foil 312 does however not exist in all types of packaging material. For instance, in the packaging material used for packages for chilled products, i.e. products that will be refrigerated, the Aluminum foil 312 is most often left out and replaced by a combination of lamination layers and paperboard layers.

Closest to the product held inside the package 100, a first and a second internal coating 314, 316, made of e.g. plastics material, can be provided. One purpose with these are that the product is hindered from coming in direct contact with the Aluminum foil 312.

Figure 4:
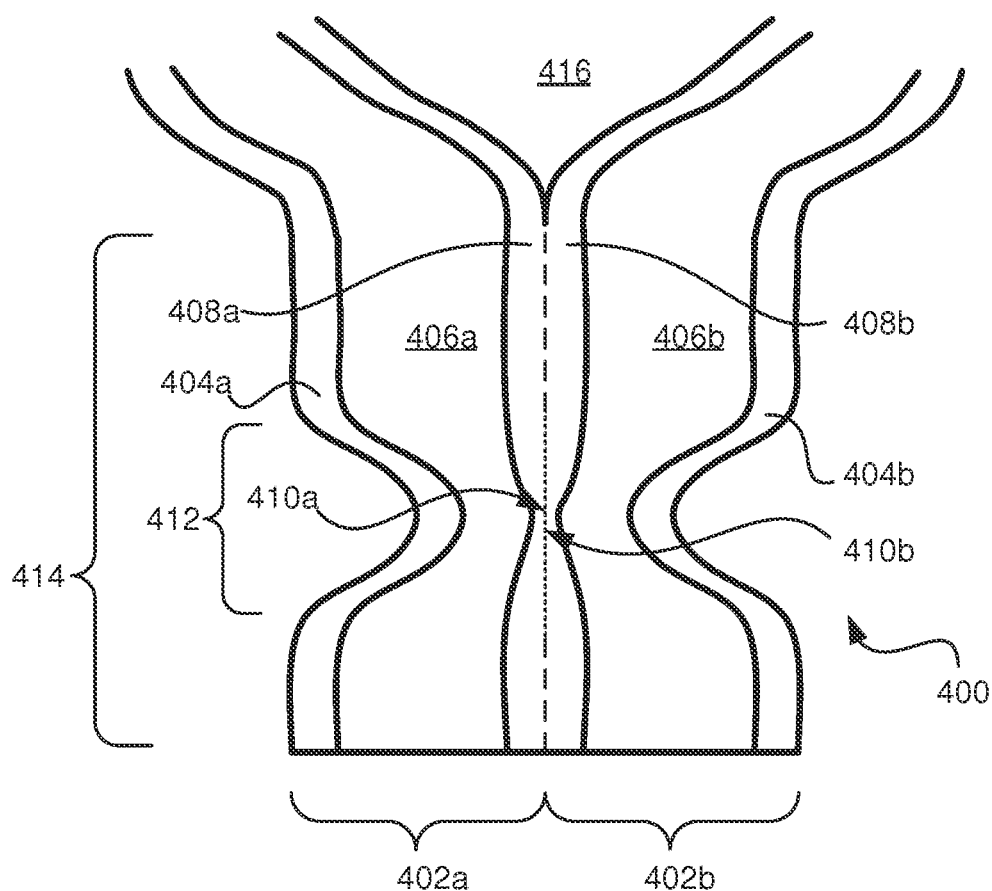

FIG. 4 generally illustrates a cross-sectional view of a lower part 400 of the package 100 in greater detail by way of example. The lower part 400 can be formed by a first section 402a and a second section 402b. Further, the package 100 can comprise an outer layer 404a, 404b, a robustness layer 406a, 406b, which may be a carton layer, and a plastic layer 408a, 408b. As illustrated in FIG. 3, these different layers may in turn comprise a plurality of layers. During a sealing step in the packaging machine 200, the plastic layer 408a, 408b can be heated such that this melt, e.g. by using induction heat sealing technology or ultrasonic sealing. By combining this with holding the first and second sections 402a, 402b against each other, the plastic layer 408a, 408b can form a merged layer 410a, 410b is formed, which in turn provides for that the lower part 400 can be formed.

During the sealing step, when holding the first and second sections 402a, 402b against each other, a sealing element provided with a ridge can be used. The ridge provides for that additional pressure can be provided in a ridge impression area 412, which can be a sub-area of a sealing section 414.

Figure 5:
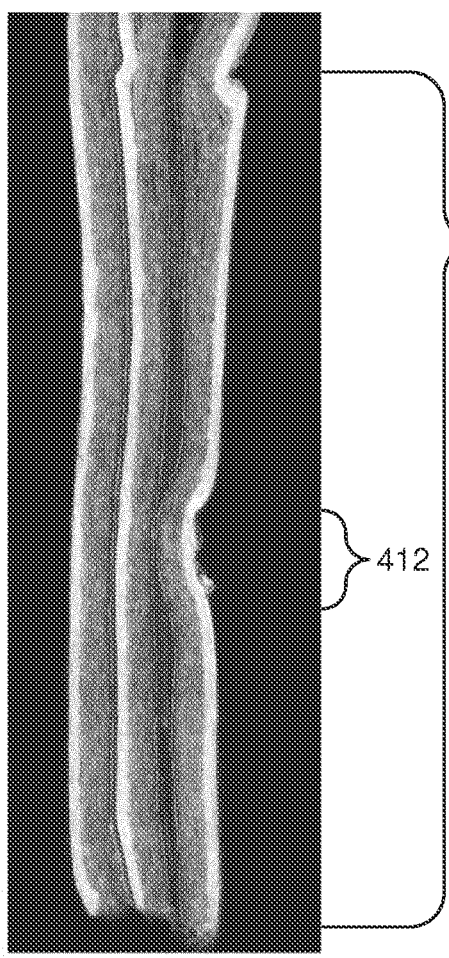
FIG. 5 illustrates an example of a cross-sectional view of a sealing section.

FIG. 5 illustrates an example of a cross-sectional view of the sealing section 414 and the ridge impression area 412 in the package 100 in more detail.

Figure 6:
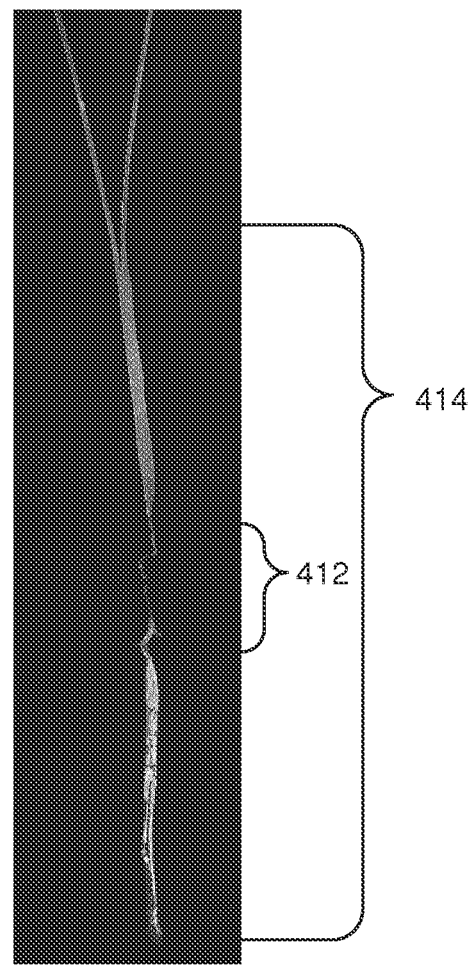
FIG. 6 illustrates another example of a cross-sectional view of the sealing section.

FIG. 6 illustrates yet another cross-sectional view of the sealing section by way of example. However, in the example illustrated in FIG. 6., all layers but the plastic layers 408a, 408b have been removed such that it is clearly illustrated how the plastic layers 408a, 408b are affected by the sealing step. The plastic layers 408a, 408b are namely affected in that these are made thinner due to the pressure applied during the sealing step.

Figure 7:
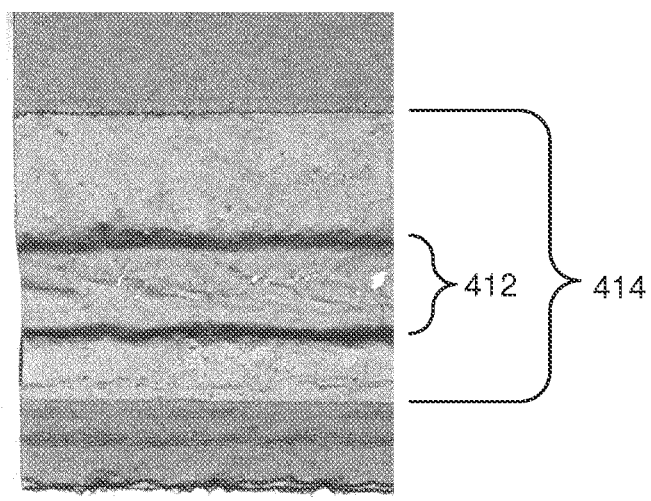
FIG. 7 illustrates an example of a front view of the sealing section.

FIG. 7 illustrates still another example of the sealing section 414, but as a front view. An effect of that the plastic layers 408a, 408b are affected during the sealing step is that light when being transmitted through the lower part 400, or any other part comprising the sealing section 414, will be facing different refractive indexes. This in turn provides for that by illuminating the lower part 400 in a controlled manner a quality assessment of the sealing section 414 can be made.

Figure 8A:
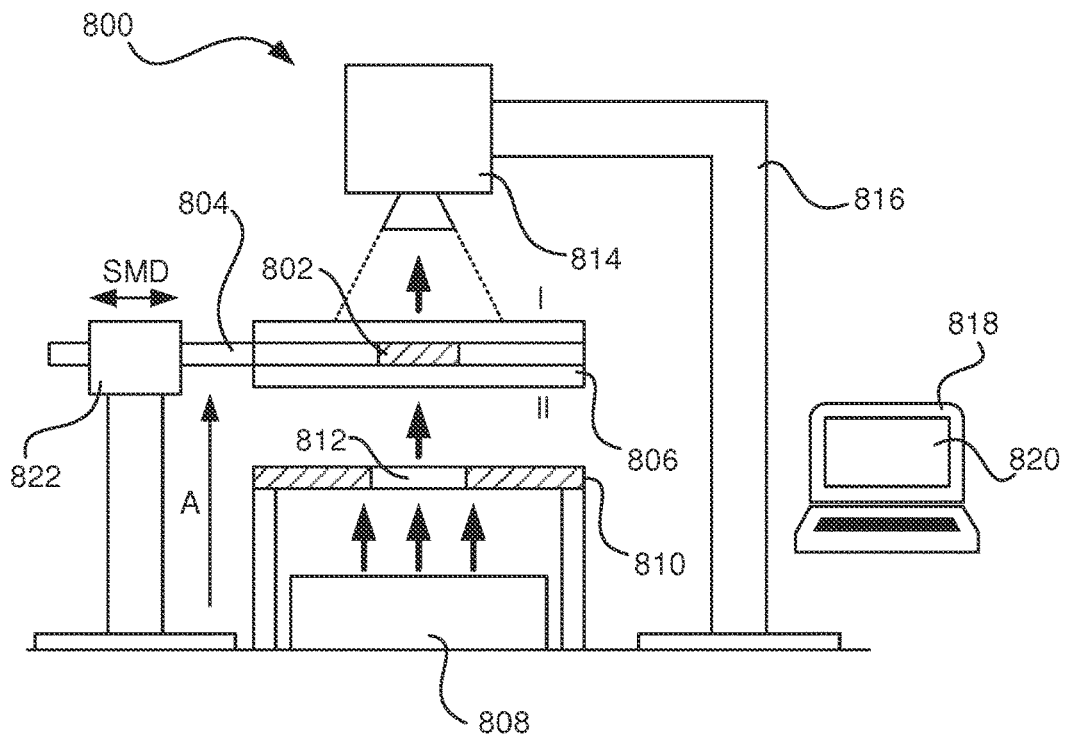
FIG. 8a-c generally illustrates by way of example an apparatus for quality assessment of the sealing section.
Figure 8B:
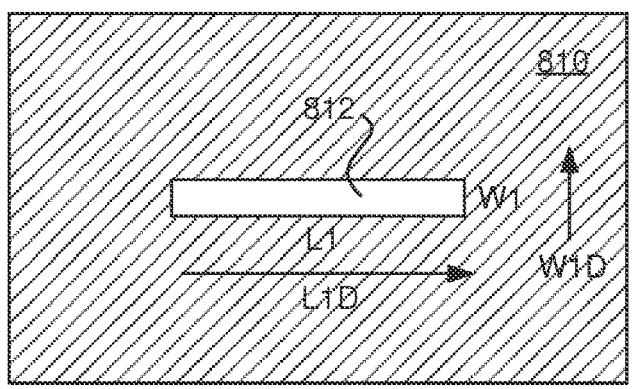
Figure 8C:
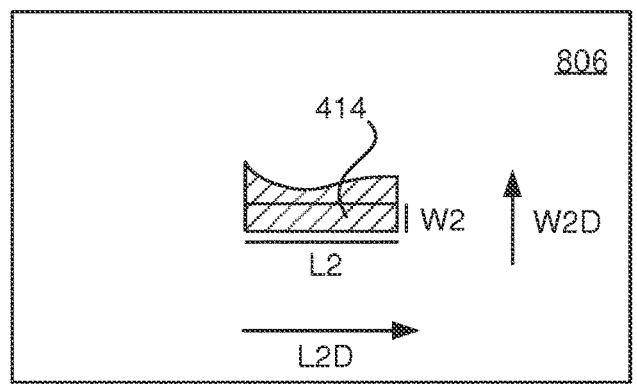

FIG. 8a-c generally illustrates by way of example an apparatus 800 for quality assessment of the sealing section 414 that is making use of the fact that light transferred through the sealing section 414 is affected differently depending on how the packaging material 300 has been affected during the sealing step.

As illustrated in FIG. 8a, a sample 802, which may be the lower part 400 illustrated in FIG. 4, can be placed in a sample holder 804 comprising a number of transparent plates 806. Light is provided by an illumination device 808, placed on a first side I of the sample holder 804, through a light controlling device 810 provided with a light emitting area 812. After being transmitted through the number of transparent plates 806 and the sample 802, the light is captured by a camera 814 that can be connected to a camera holder 816, wherein the camera 814 can be placed on a second side II of the sample holder 804.

Image data captured by the camera 814 can be transferred to a computer 818, which may be a lap top computer as illustrated, but also an embedded processing device in the camera 814 or any other processing device configured for handling image data. The computer 818 may be equipped with a screen 820.

FIG. 8b illustrates the light controlling device 810 from a top view. The light emitting area 812 may have a first length L1 extending in a first length direction L1D and a first width W1 extending in a first width direction W1D. The first length direction L1D and the first width direction W1D can be perpendicular. The first length L1 may be greater than the first width W1.

FIG. 8c illustrates the number of transparent plates 806 from a top view. The sample 802 comprising the sealing section 414 may have a second length L2 extending in a second length direction L2D and a second width W2 extending in a second width direction W2D. The second length direction L2D and the second width direction W2D can be perpendicular. The second length L2 may be greater than the second width W2. The sample 802 can be placed such that the first length direction L1D is parallel with the second length direction L2D.

Figure 9A:
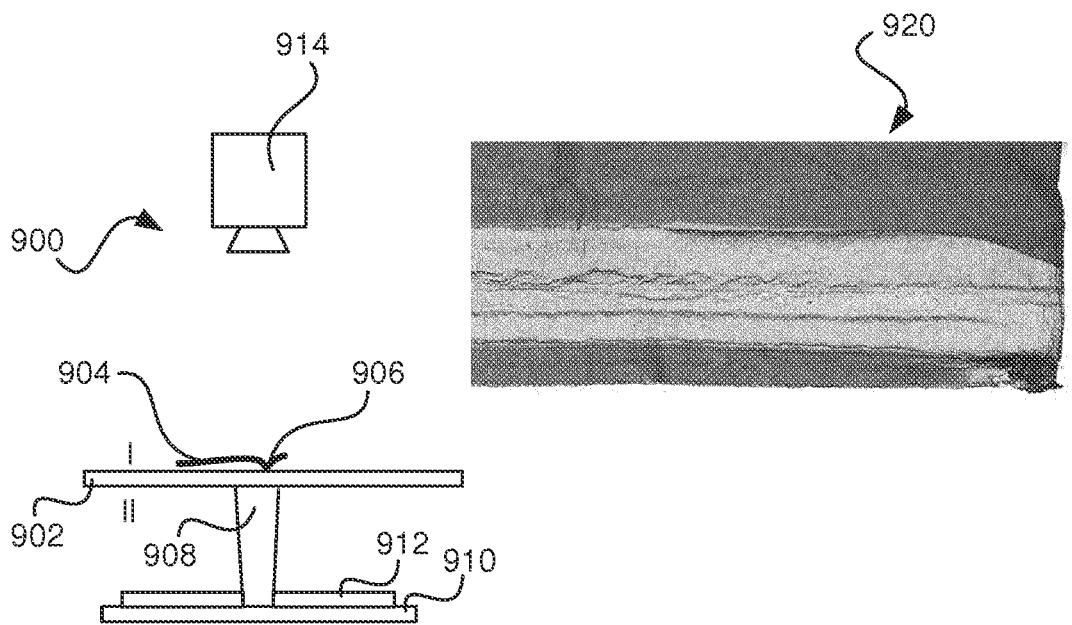
FIGS. 9a and 9b generally illustrate two other examples of the apparatus.
Figure 9B:
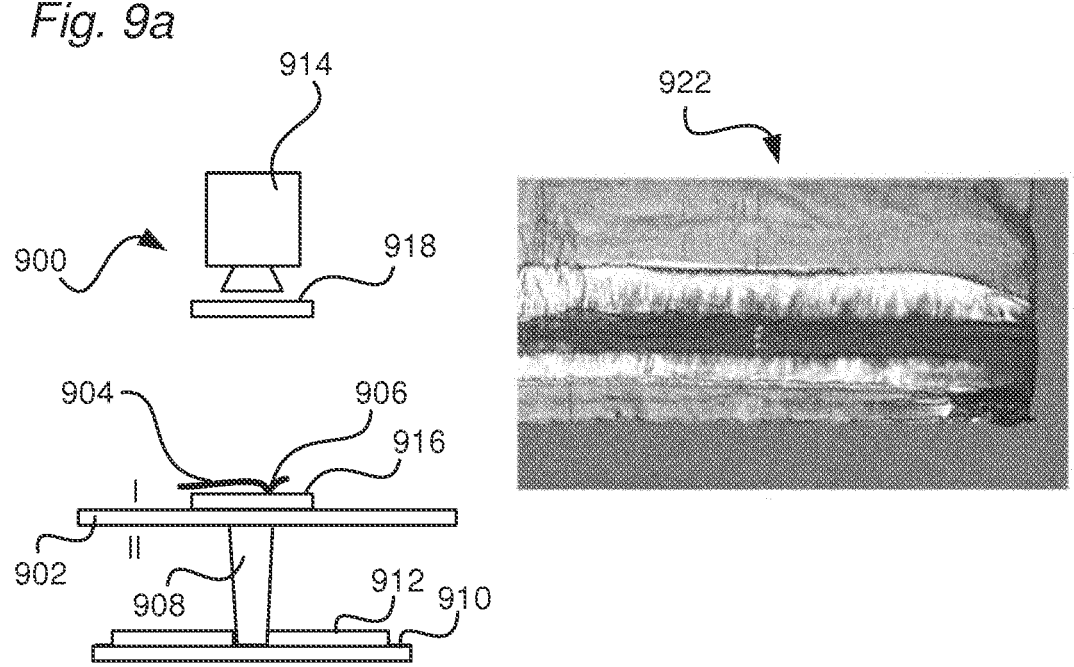

FIGS. 9a and 9b illustrate two examples of apparatuses 900 for quality assessment of the sealing section 414. In FIG. 9a, the apparatus 900 is illustrated without polarizing filters and in FIG. 9b the apparatus 900 is illustrated with polarizing filters.

More specifically, as illustrated in FIG. 9a, a sample holder 902 can be provided for holding a sample 904 having a ridge impression area 906. Light 908 is emitted from an illumination device 910 and passing a light controlling device 912 before reaching the sample holder 902 and the sample 904. The light passing through the sample holder 902 and the sample 906 can be captured by a camera 914.

As illustrated in FIG. 9b, the apparatus 900 further comprises a first polarizing filter 916 placed between the sample holder 902 and the sample 904, and a second polarizing filter 918 placed between the sample 904 and the camera 914. The first polarizing filter 916 may be a −45 degrees polarizing filter, and the second polarizing filter 918 may be a +45 degrees polarizing filter. An effect of having the polarizing filters 916, 918 can be that only light whose polarity is affected when being transferred through the sealing section 904 is captured by the camera 914.

Figure 10:
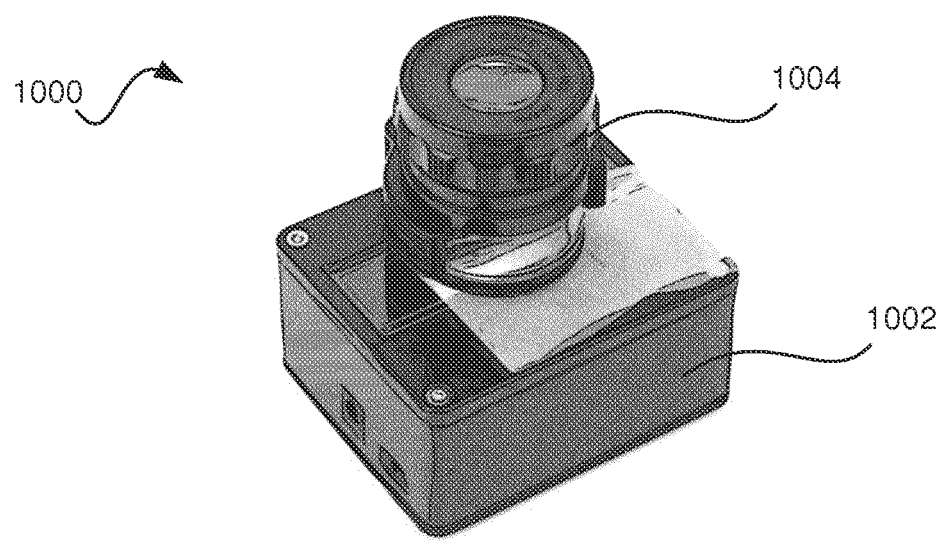
FIG. 10 illustrates by way of example an embodiment of the apparatus.

The apparatus 1000 may be embodied in a number of different ways. An example of an embodiment of the apparatus 1000 is illustrated in FIG. 10. In this embodiment there is no camera provided for capturing the light transferred through the sealing section, but instead only a sample holder 1002, in turn comprising inter alia an illumination device, and a magnification device 1004 are provided. To assess the quality of the sealing section, an operator, i.e. a user, can look at the sealing section through the magnification device 1004. In case a camera is provided the magnification device 1004 can form part of the camera.

Figure 11A:
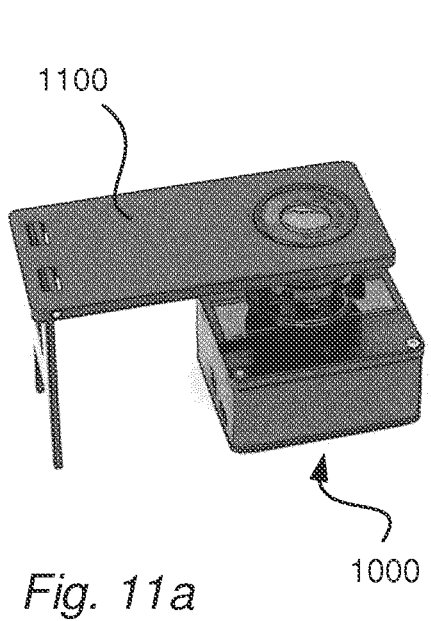
FIG. 11a-b illustrates by way of example another embodiment.
Figure 11B:
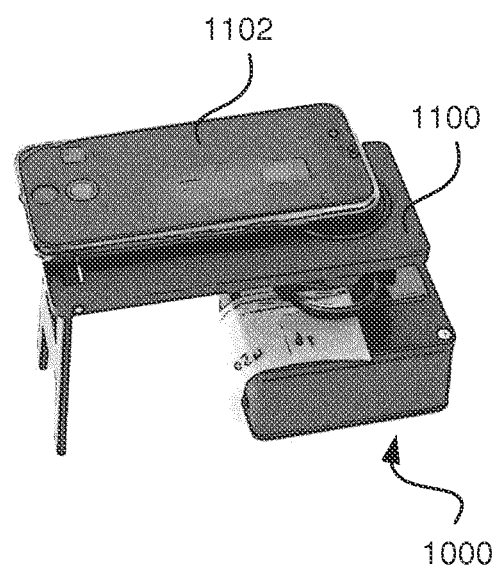

FIGS. 11a and 11b illustrate another embodiment of the apparatus 1000. In line with the embodiment of the apparatus 1000 illustrated in FIG. 10 the sample holder 1002 and the magnification device 1004 can be provided. However, in addition to the embodiment illustrated in FIG. 10, a camera holder 1100 can be provided. By using the camera holder 1100, a mobile phone 1102 with a camera, or any other camera-equipped device, may be placed such that image data may be captured using the camera of the mobile phone 1102.

Figure 12:
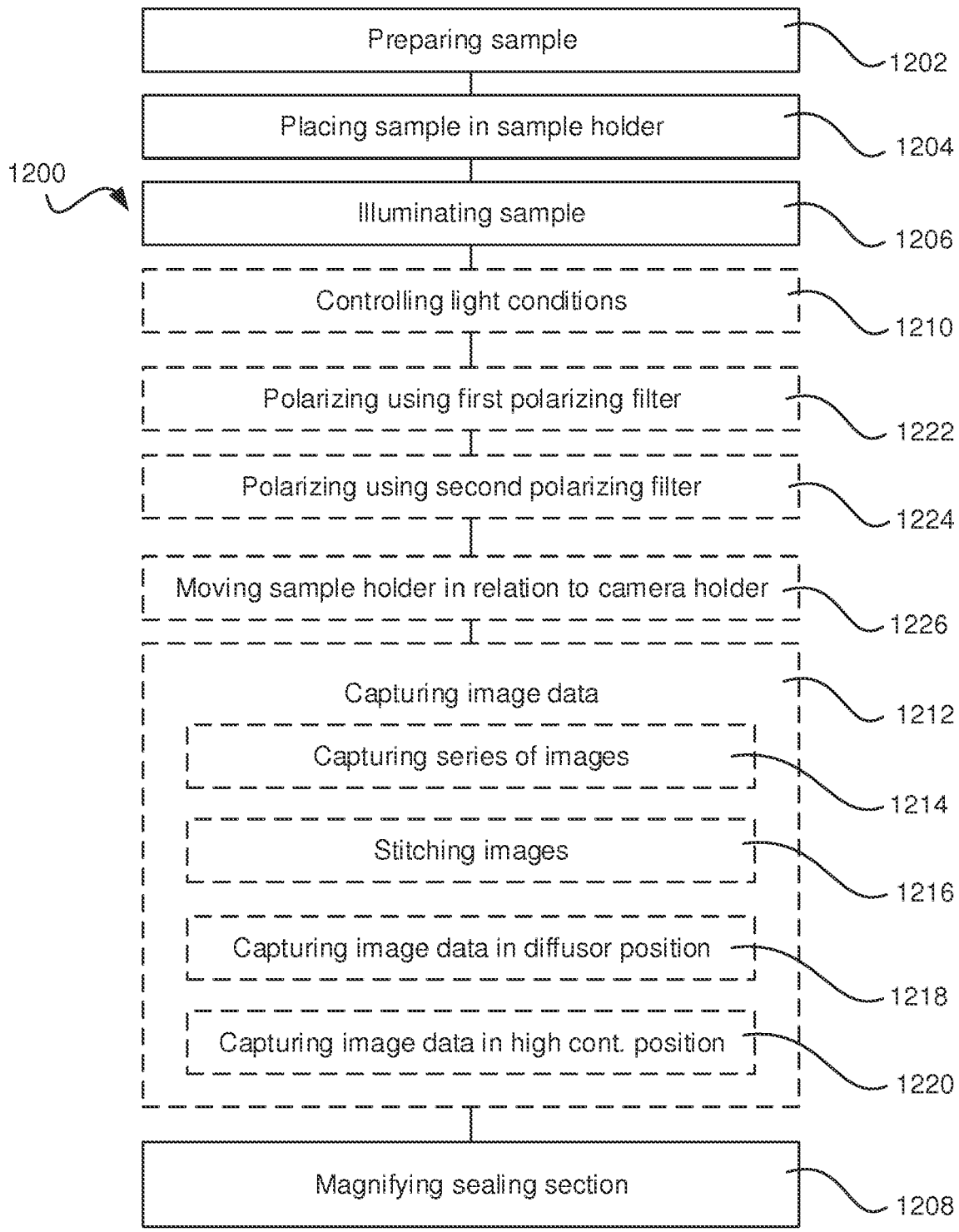
FIG. 12 is a flowchart illustrating steps of a method for quality assessment of the sealing section.

FIG. 12 is a flowchart 1200 illustrating steps of a method for quality assessment of the sealing section. In a first step 1202, a sample can be prepared. In a second step 1204, the sample can be placed in the sample holder. In a third step 1206, the sample can be illuminated. In a fourth step 1208, the sealing section can be magnified.

Optionally, in a fifth step 1210, the light may be controlled. For instance, the light may be controlled by changing a distance between the sample holder 804 and the light controlling device 810 illustrated in FIG. 8. The light may be controlled such that image data may be captured when having the light controlling device 810 in a high contrast position, and such that image data may captured when having the light controlling device in a diffusor light position.

Optionally, in a sixth step 1212, image data may be captured. As an alternative to capturing image data in the form of a single image, a series of images may be captured in a seventh step 1214, being a sub-step to the sixth step 1212. The series of images may be stitched together in an eighth step 1216, also being a sub-step to the sixth step 1212. Further, as explained above, if having the light controlling device 810 that can be set in the diffusor light position and the high contrast position, image data may be captured with the light controlling device set in the diffusor light position in a ninth step 1218, and image data may be captured with the light controlling device set in the high contrast position in a tenth step 1220.

Optionally, in an eleventh step 1222, light emitted from the illumination device 910 may be polarized by using e.g. a −45 degrees polarizing filter, and, in a twelfth step 1224, light passed through the sample holder 902 may be polarized by using e.g. a +45 degrees polarizing filter.

Optionally, in a thirteenth step 1226, the sample holder 804 may be moved in relation to the camera holder 816 such that image data may be captured at several locations. This step may be combined with the seventh and eighth steps 1214, 1216. Even though the steps are presented in a specific order, this is to be seen as one example out of many possibilities.

From the description above follows that, although various embodiments of the invention have been described and shown, the invention is not restricted thereto, but may also be embodied in other ways within the scope of the subject-matter defined in the following claims.

The invention claimed is:

1. A method for quality assessment of a sealing section of a package for food products, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the method comprising:
preparing a sample comprising the sealing section of the package,
placing the sample in a sample holder, wherein at least part of the sample holder is transparent, by orientating the sample according to a pre-set orientation and fixating the sample,
illuminating the sample by using an illumination device arranged on a second side of the sample holder,
magnifying the sealing section of the sample by using a magnification device arranged on a first side of the sample holder, wherein the first and second side are opposite sides of the sample holder, and a step of capturing image data depicting the sealing section comprising:
  controlling the light by using a light controlling device,
  capturing image data with the light controlling device set in a diffusor light position, and
  capturing image data with the light controlling device set in a high contrast position.

2. The method according to claim 1, wherein:
the step of capturing includes using a camera fixated to a camera holder and a computer connected to the camera, wherein the camera is placed on the second side of the sample holder, and wherein the first and second sides are opposite sides of the sample holder.

3. The method according to claim 2, further comprising:
polarizing light emitted from the illumination device before reaching the sample by using a first polarizing filter arranged between the sample and the illumination device, and
polarizing light passed through the sample holder before reaching the camera by using a second polarizing filter arranged between the sample and the camera.

4. The method according to claim 3, wherein before the step of preparing the sample, the method includes: providing the package, which includes at least the robustness layer, the plastic layer, and the sealing section.

5. The method according to claim 4, wherein before the step of providing the package, the method includes: forming the sealing section by holding a first section and a second section of the package against each other while providing heat such that the plastic layer of the first and second section melt and thereby provide for the first and second sections to adhere to each other.

6. The method according to claim 3, wherein the first polarizing filter is a −45 degrees polarizing filter, and the second polarizing filter is a +45 degrees polarizing filter.

7. The method according to claim 2, further comprising:
moving the sample holder in relation to the camera holder by using a stepping motor,
wherein the step of capturing image data depicting the sealing section comprises:
  capturing a series of images, wherein each image is associated with a position of the stepping motor, and
  stitching the series of images into one and the same image.

8. The method according to claim 1, wherein the illumination device is provided with a light emitting area having a first length extending in a first length direction and a first width extending in a first width direction, wherein the first length is greater than the first width, wherein the sealing section has a second length extending in a second length direction and a second width extending in a second width direction, wherein the second length is greater than the second width, and wherein the first length direction is parallel with the second length direction.

9. The method according to claim 1, wherein the robustness layer is a carton layer.

10. A method for quality assessment of a sealing section of a package for food products, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the method comprising:
preparing a sample comprising the sealing section of the package,
placing the sample in a sample holder, wherein at least part of the sample holder is transparent, by orientating the sample according to a pre-set orientation and fixating the sample,
illuminating the sample by using an illumination device arranged on a second side of the sample holder,
magnifying the sealing section of the sample by using a magnification device arranged on a first side of the sample holder, wherein the first and second side are opposite sides of the sample holder,
capturing image data depicting the sealing section using a camera fixated to a camera holder and a computer connected to the camera, wherein the camera is placed on the second side of the sample holder, and wherein the first and second sides are opposite sides of the sample holder,
polarizing light emitted from the illumination device before reaching the sample by using a first polarizing filter arranged between the sample and the illumination device, and
polarizing light passed through the sample holder before reaching the camera by using a second polarizing filter arranged between the sample and the camera.

11. A method for quality assessment of a sealing section of a package for food products, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the method comprising:
preparing a sample comprising the sealing section of the package,
placing the sample in a sample holder, wherein at least part of the sample holder is transparent, by orientating the sample according to a pre-set orientation and fixating the sample,
illuminating the sample by using an illumination device arranged on a second side of the sample holder,
magnifying the sealing section of the sample by using a magnification device arranged on a first side of the sample holder, wherein the first and second side are opposite sides of the sample holder,
capturing image data depicting the sealing section using a camera fixated to a camera holder and a computer connected to the camera, wherein the camera is placed on the second side of the sample holder, and wherein the first and second sides are opposite sides of the sample holder,
moving the sample holder in relation to the camera holder by using a stepping motor,
wherein the step of capturing image data depicting the sealing section comprises:
  capturing a series of images, wherein each image is associated with a position of the stepping motor, and
  stitching the series of images into one and the same image.

* * * * *